United States Patent [19]
Jenkins

[11] Patent Number: 5,181,271
[45] Date of Patent: Jan. 19, 1993

[54] OPTICAL FIBER STORAGE SYSTEM AND METHOD OF INSTALLING OPTICAL FIBER USING SAME

[75] Inventor: Peter D. Jenkins, Woodbridge, England

[73] Assignee: British Telecommunications public limited company, Great Britain

[21] Appl. No.: 768,425

[22] Filed: Sep. 18, 1991

[30] Foreign Application Priority Data

Mar. 23, 1989 [GB] United Kingdom ............... 8906765

[51] Int. Cl.⁵ ..................... G02B 6/02; B65H 59/00; B65H 18/28
[52] U.S. Cl. .................... 385/135; 385/134; 385/137; 385/147; 385/109; 254/134.4; 242/166; 242/170; 242/171; 242/174
[58] Field of Search .......... 385/134, 135, 136, 137, 385/147, 100, 109; 254/134.4; 242/163, 166, 170, 171, 174, 177

[56] References Cited

U.S. PATENT DOCUMENTS

| | | | |
|---|---|---|---|
| 3,128,961 | 4/1964 | Wickwire | 242/82 |
| 3,601,326 | 8/1971 | Gordon | 242/18 |
| 3,677,491 | 7/1972 | Gerwig | 242/163 |
| 3,689,005 | 9/1972 | Newman | 242/163 |
| 3,748,817 | 7/1973 | Newman | 53/21 FW |
| 4,077,610 | 3/1978 | Masuda | 254/134.4 |
| 4,691,896 | 9/1987 | Reeve et al. | 254/134.4 |
| 4,709,980 | 12/1987 | Coll et al. | 385/135 |
| 4,802,724 | 2/1989 | Fraize et al. | 385/135 |
| 4,950,049 | 8/1990 | Darsey et al. | 385/134 |
| 4,990,033 | 2/1991 | Handley et al. | 254/134.4 |
| 5,109,983 | 5/1992 | Malone et al. | 385/135 X |
| 5,119,459 | 6/1992 | Meyerhoefer | 385/135 |

FOREIGN PATENT DOCUMENTS

| | | | |
|---|---|---|---|
| 660121 | 6/1965 | Belgium | 254/134.4 X |
| 0108590 | 5/1984 | European Pat. Off. | 254/134.4 X |
| 0253636 | 1/1988 | European Pat. Off. | 254/134.4 X |
| 0323028 | 7/1989 | European Pat. Off. | 254/134.4 X |
| 57-126536(A) | 8/1982 | Japan | 254/134.4 X |
| 59-217565(A) | 12/1984 | Japan | 254/134.4 X |
| 63-199307(A) | 8/1988 | Japan | 254/134.4 X |

Primary Examiner—Brian Healy
Attorney, Agent, or Firm—Nixon & Vanderhye

[57] ABSTRACT

An optical fibre storage system comprising a container in which turns of fibre (4) are wound in a substantially helical formation, the diameter of the turns and container being such the turns of fibre are maintained in position by their natural resilience pressing them outwardly against the inside of the container (5). The inside of the container may be coated to aid location of the turns. In another embodiment an inflatable member located within the turns is inflated to press against them to aid positional stability. A source of gas may be connected to the container to enable propulsion of the fibre out of the container in a duct, or the container itself may be pressurized.

15 Claims, 6 Drawing Sheets

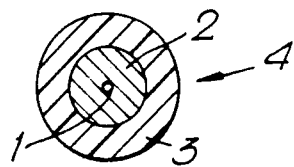
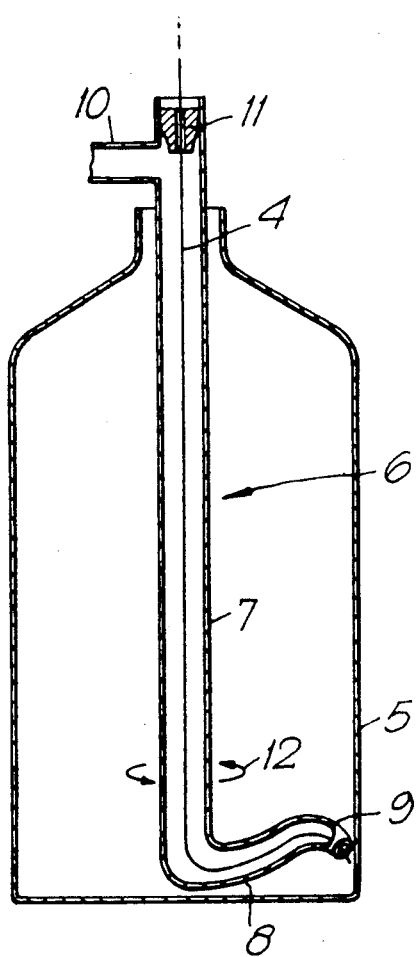
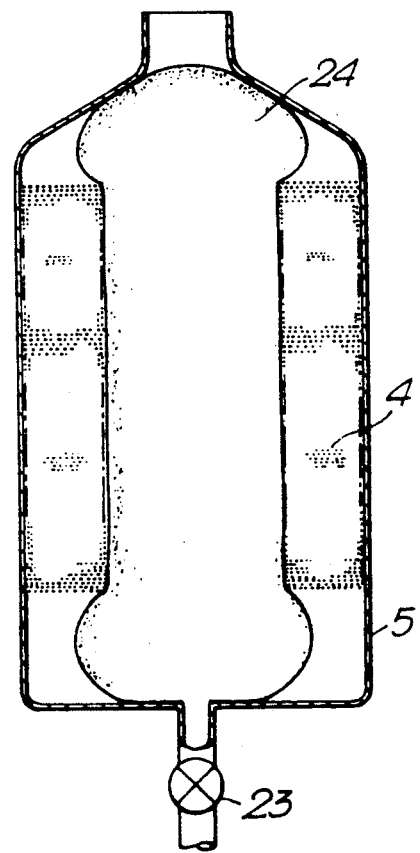
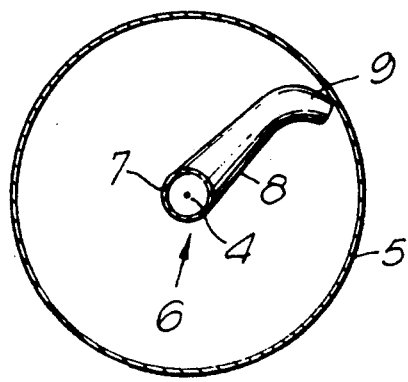

OPTICAL FIBER STORAGE SYSTEM AND METHOD OF INSTALLING OPTICAL FIBER USING SAME

BACKGROUND

I. Field of the Invention

This invention relates to storage of optical fibre, and especially to storage of delicate fibres without extensive external sheathing.

II. Prior Art and Other Considerations

European patent specification 108590 describes a technique known as fibre blowing in which an optical fibre package is advanced through a duct by the viscous drag of a fluid, usually gaseous, medium. The fibre package may be fed into the duct by wheels or other means from a reel, or freely paid out from a coil. The fibre package installed by the fibre blowing technique may have a low density foam coating that provides a high surface area to weight ratio for the package, but in some instances it is possible to blow optical fibres that do not have additional foam or other sheathing, for example a 'bare' fibre consisting of a core, cladding and primary acrylic coatings may be installed by fibre blowing. Such bare fibres are delicate, and therefore mechanical feeding techniques such as wheels to pull the fibre off a reel are preferably avoided. Also, due to the fine nature of such fibres, loose laid coils tend to become entangled by virtue of adjacent turns sticking to each other, so that rapid paying out from a loose coil is not satisfactory.

SUMMARY

The present invention is directed towards a storage technique for bare fibre that overcomes or alleviates the above problems.

Accordingly the present invention provides an optical fibre storage system comprising a container having turns of optical fibre wound within it in a substantially helical formation, the diameters of the turns and the container being such that the turns of the fibre are maintained in position by their natural resilience pressing them outwardly against the inside of the container.

The invention also provides apparatus for storing optical fibres, the apparatus comprising a container, and a fibre-dispensing tube within the container, the tube having first and second contiguous portions, the first tube portion extending axially within the container, and the second tube portion extending generally radially towards a side wall of the container, the tube and the container being relatively axially rotatable and being arranged to have relative axial movement so that fibre emerging from the free end of the second tube portion is laid around the inner wall of the container in a helical coil.

BRIEF DESCRIPTION OF THE DRAWINGS

The invention will now be described by way of example with reference to the accompanying drawings, in which:

FIG. 1 is a cross-section through a typical bare fibre;

FIG. 2 is a schematic diagram of an apparatus for coiling fibre within a container in accordance with the invention;

FIG. 2a is an embodiment of a container having wound fibre within it;

FIG. 3 is a plan view of the apparatus of FIG. 2;

FIG. 10b is a sectioned side view of a tapered manifold of the embodiment of FIG. 10a.

DETAILED DESCRIPTION OF THE DRAWINGS

Figure 4:
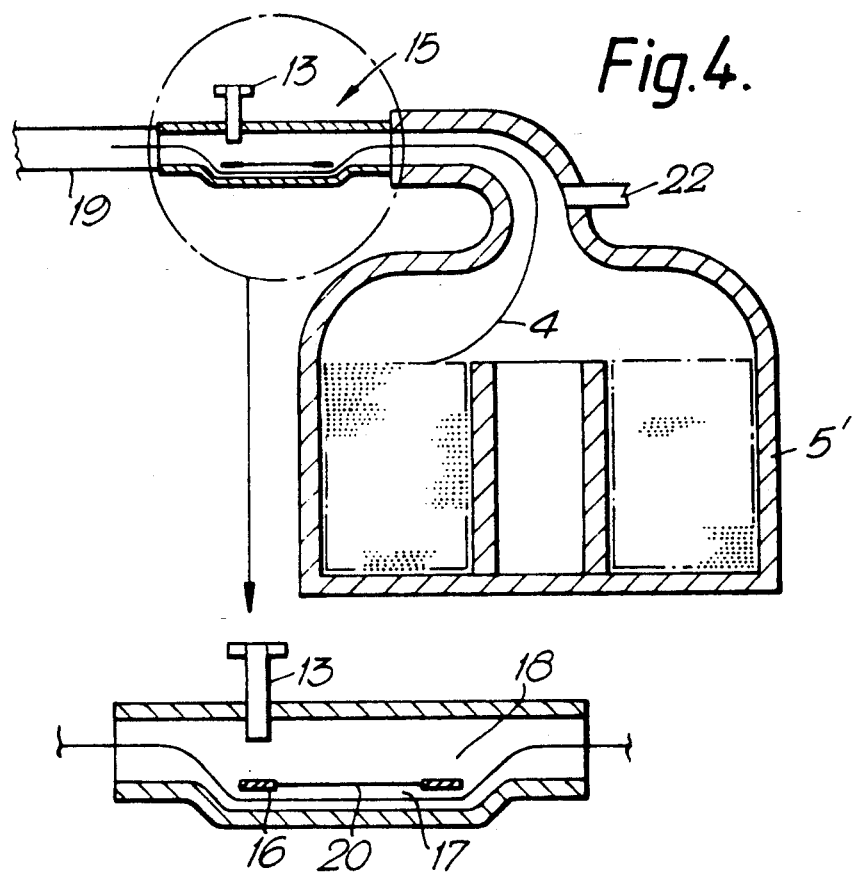
FIGS. 4 and 5 are schematic diagrams of a preferred embodiment of the invention for automatic release of fibre, shown respectively with fibre release inhibited and permitted.

FIG. 1 shows a typical bare optical fibre which comprises a core 1 and cladding 2 (both of which are glass in normal optical fibres), which may together comprise a single or multi-mode fibre, and an outer acrylic coating 3 which may be coloured for identification purposes. This structure is typical of present bare optical fibres, but the present invention would also be applicable to other structures.

The fibre, generally referenced 4, is stored in accordance with the present invention in a container 5 after production until such time as it is desired to use the fibre, and may be installed in the container directly from the fibre production line or from an intermediate storage stage. The container 5 is of generally cylindrical shape having a diameter of 9 to 15 cm for fibre of diameter 0.25 mm, and the fibre 4 is introduced into the container by the apparatus shown in FIG. 2.

This apparatus comprises a tube 6 which has an upright (as viewed) portion 7 and a downwardly curved portion 8 which together define a J shape, and the end of the curved portion 8 has an additional curved lip 9 which extends laterally out of the plane of the J so that the opening of the lip is directed obliquely towards the side of the container 5, as illustrated in plan in FIG. 3. The fibre 4 is threaded through the tube 6, and is advanced therethrough by a flow of compressed gas introduced to the end of the upright portion 7 of the tube in the manner described in our GB applications 8706803 and 8813068, for example via a branch 10. A seal 11 prevents the gas from escaping in the direction of the incoming fibre. Other arrangements for fibre feed and gas entry may be employed.

As the fibre 4 is advanced through the tube 6 by the gas flow, the fibre passing out of the end of the lip 9 is directed on to the side wall of the container 5, and simultaneously the tube is rotated about an axis passing along the upright portion 7 in the direction of arrow 12 so that the fibre is progressively directed in an annulus around the inside of the container. After each turn, the tube 6 is moved incrementally upwardly so that the next turn lies adjacent to the previous turn in a closely wound helix; instead of a stepwise movement the tube may be moved upwardly continuously so that the lip 9 moves on a helical path. Once the lip 9 reaches the top of the container 5 (or as close to the top as it is desired to wind fibre) the upward movement is reversed. On the downward travel the tube 6 may be moved at the same rate as it is advanced upwardly so that a full sequence of turns of the fibre 4 is laid over the turns laid on the upward travel, but it is found preferably to move the tube downwardly more rapidly so that only one, a few or even a part turn is deposited on the inside of the container 5 on the downward travel, and then upward travel is resumed as previously. The reason for this preference is that, when the fibre 4 is uncoiled from the container 5, it is removed in the reverse direction so that the fibre turns are removed from the uppermost end of the turn sequence that is laid during upward travel of the tube, and therefore it does not have to cross over the next turn. Conversely, the fibre 4 unwinds from the bottom of a sequence of turns that is laid during downward travel, and thus there is a greater risk of interference with the adjacent turns. Instead of moving the J tube 6 up and down, it is possible to move the container 5.

The speed with which the tube 6 is rotated and advanced vertically, and the rate at which the fibre 4 is advanced through the tube, are controlled so that, for each 360° rotation of the tube, a fibre length slightly exceeding that required to lie around the inner circumference of the container 5 is advanced into the container. This both allows for the slightly helical, path and enables the fibre 5 to be pressed outwardly by virtue of its own natural resilience. In order to achieve this, the fibre 4 needs to be ejected from the end of the J tube 6 to hit the side of the container 5.

Containers suitable for use in the present invention include bottles of the type employed for bottling beers and carbonated soft-drinks. Such bottles are generally formed of oriented polyethylene terephthalate (PET), and have burst pressures of about 150 psi (10 Bar) or more, despite their very thin walls. Safe working pressures as high as 4 Bar can thus be used, although in general lower pressures will be used. Alternative sources of the same bottle type may well enable operating pressures as high as 5 to 6 Bar to be used, despite the very low cost of the bottles.

In a prototype experiment it was discovered that subsequent layers of turns of fibre had less tendency to drop than the first layer of turns, most probably due to the slightly greater friction between adjacent layers than between the first fibre layer and the smooth surface of the container. It is, therefore, preferable to have an inner surface on the container that provides some frictional resistance. This may be achieved by having a roughened surface or by a coating, especially a fibrous coating enabling the fibre 4 to stick between hairs that, whilst aiding adherence of the turns of fibre, are sufficiently weak to provide insignificant resistance to unwinding, thereby minimising risk of damage to the fibre.

One means that we have found to be particularly useful in helping to prevent the coiled fibre 4 from dropping to the bottom of the bottle is to provide pins or fingers, preferably resilient, on the interior surface of the bottle.

Figure 9:
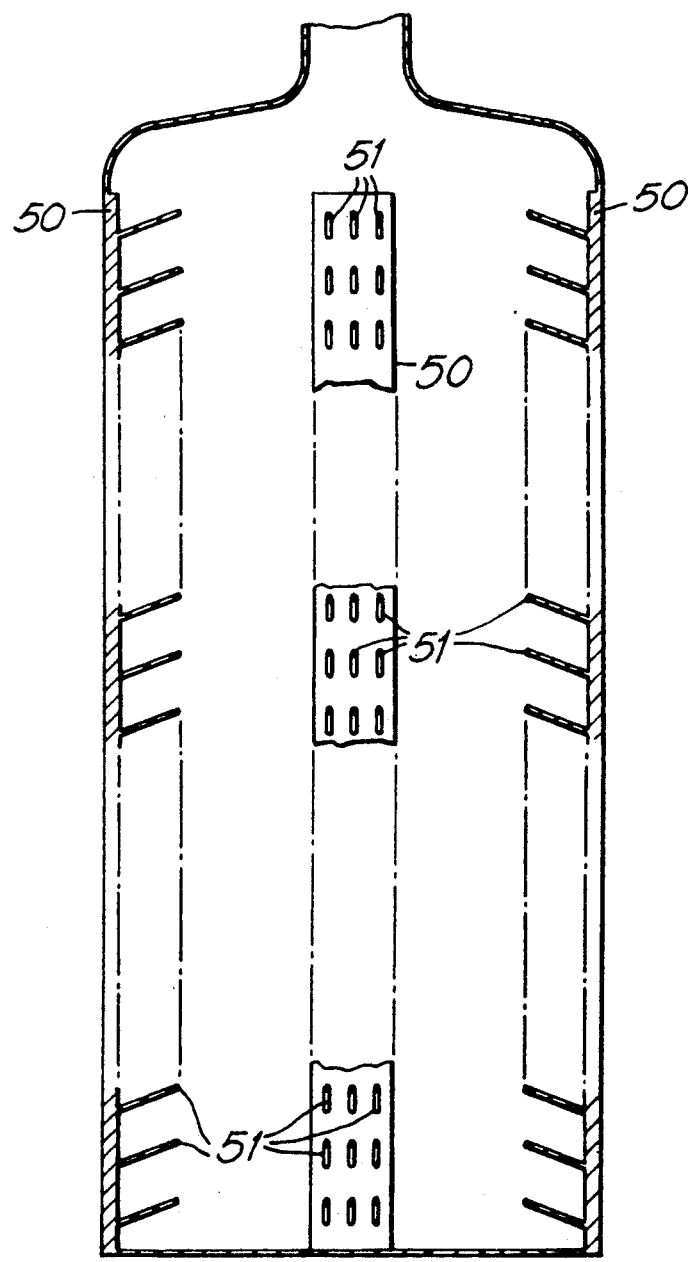
FIG. 9 shows details of friction enhancing means.

Suitable pins or fingers may conveniently be provided by means of an insert or inserts, for example as shown in FIG. 9. Four separate strips 50 of resilient material, in this case polyurethane rubber, extend up the inside of the bottle. Each strip 50 is provided, on the surface which faces inwardly of the bottle wall, with a plurality of thin flexible fingers 51 or ribs, individual fingers, ribs or multiples of fingers or ribs being provided at intervals, preferably regularly spaced up the height of the bottle. Typically, the installed vertical distance between adjacent projections or sets of projections is of the order of 10 mm. For ease of manufacture, a single sheet of material provided with projections may be installed in a rolled form via the neck or opening of the bottle, the sheet unfurling once inside the bottle to provide the desired array of projections on the bottle's inside wall. Preferably, such a sheet is fixed in place by means of an adhesive.

Where several separate components are used spaced around the interior periphery of the bottle to provide the (partially) supporting pins, the components may be disposed vertically in the bottle—that is disposed parallel to the longitudinal axis of the bottle, or may be tilted or disposed in a helical path.

If an inflatable balloon or membrane is to be used in the bottle, the distal ends of the fingers or ribs may be enlarged to reduce the risk of the balloon or membrane being perforated thereby.

Typically the fingers will be 0.5 to 2 mm in diameter, and will be 5 to 15 mm in length, preferably about 10 mm.

It will be noted that each turn of fibre laid as described above has 360 degrees of stored torsion, and therefore when the fibre is pulled out from the turn this torsion is removed.

Figure 5:
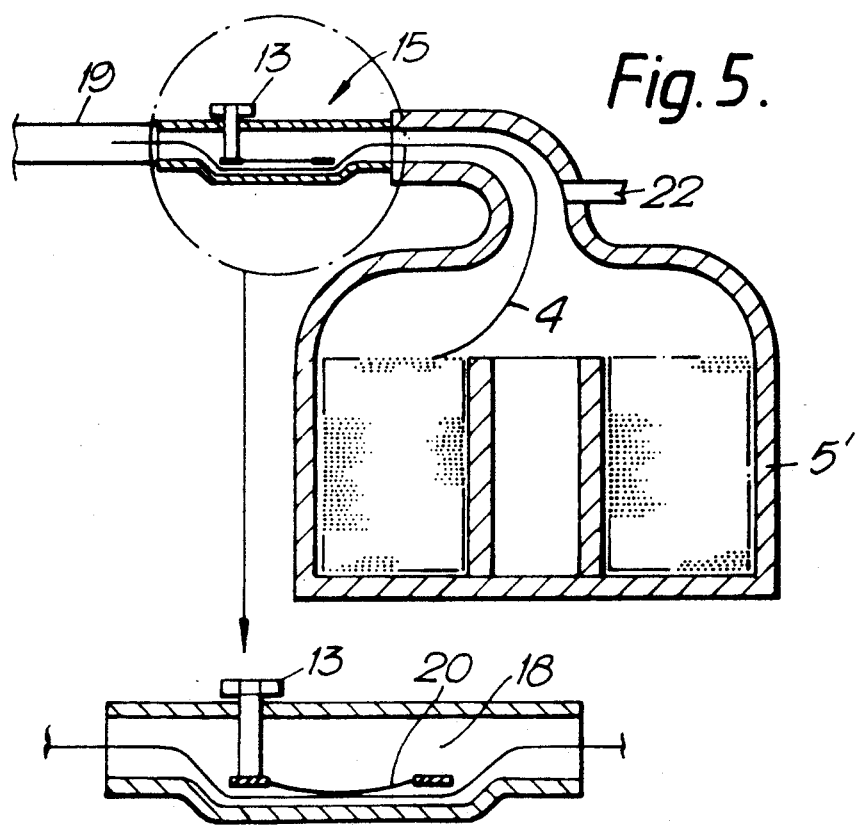

Conveniently, the container may be pressurised and provided with a fibre release and inhibitor assembly, generally referenced 15, shown in FIGS. 4 to 8. The container 5' of FIGS. 4 and 5 is a modified version of the container 5 of FIGS. 2 and 3. After, installation of turns of fibre as described above, the container 5' is pressurised, sealed and maintained under pressure. When release of fibre is required, a valve 13 is opened and the fibre 4 is progressively blown out of the container 5' by release of the pressure until a sufficient length of fibre has been released, whereupon the valve is closed and the release of pressure and fibre is inhibited.

A simple valve that presses on to the fibre 4 would cause damage, and likewise a sudden halt of the fibre may cause damage. The release/inhibitor mechanism 15, therefore, includes a brake. The release and inhibitor assembly 15 comprises a passageway extending from the container 5' and through which the fibre 4 is threaded. This passageway is divided into a double passageway by a dividing wall 16. As shown in FIGS. 4 and 5, the fibre 4 is diverted into one of the passageways, referenced 17, and the other passageway 18 is provided with the valve 13.

A separate port 22 for pressurising the container 5' may be provided, or the container 5' may be pressurised through the assembly 15 with the valve 13 open, and then the valve 13 closed before the pressurising source is disconnected. During the pressurising process, and for transportation, the free end of the fibre 4 may be taped or clipped to the outermost end of the braking section to prevent unthreading. The end portion would generally be cleaved prior to connection, after installation along a duct, and so any damage caused due to securing or exposure is eliminated.

An installation duct 19 is connected to the outermost end of the assembly 15, and after connection in order to commence installation the valve 13 is opened to the configuration shown in FIG. 4. Pressurised gas then commences escaping from the container 5' along the passageways 17 and 18 and into the duct 19, and propels the fibre 4 along the duct. Various techniques may be employed to aid insertion of the first part of the fibre 4 into the duct 19, including manual insertion of a length of the fibre released from the container 5' prior to connection of the duct, or venting the duct (or a connection tube) a short distance away from the container in order to create a high local flow.

When it is desired to cease the installation process, the valve 13 is closed. At this point, there is still a passageway for propellant along the passageway 17, although this passageway in fact should be small and insufficient to provide a substantive alternative route for the air. A part of the wall 16 between the passageways 17 and 18 is made of a membrane 20 of flexible, elastic material such as a soft grade of rubber; and, as pressure builds up in the now closed off passageway 18, the membrane 20 balloons outwardly into the passageway 17 and commences pressing against the fibre 4 and the walls of passageway 17. The sizes of the membrane 20 and passageways 17 and 18 are such that, at the operating pressures of the container 5'; the membrane 20 is able completely to close off the passageway 17. It should be noted that the passageway 17 is drawn on an enlarged scale for clarity: in fact it should only be sufficiently wide for the passage of the fibre 4, and thus very little air flow to enable closure by the flexible membrane. The passage 18 is much larger for a high flow, with little pressure differential.

Since the expansion of the membrane 20 into the passageway 17 takes a finite time, there is a period after closure of the valve 13 when the membrane bears against the fibre 4 and the wall of the passageway 17, but not sufficiently firmly to stop all flow through the passageways 17 and 18. During this period, the fibre 4 is retarded both by friction and reduced flow, which has the advantage of preventing sudden tensioning of the fibre when it is finally stopped. In a similar way, successively opening and closing of the valve 13 may be used to slow down installation when the pressure in the container 5' is comparatively high (for example during the initial stages of discharge) without wasting propellant. After closure of the valve 13, installation can be recommenced by opening the valve. Alternatively, the installed length of the fibre 4 may be cut free, and the remaining unused fibre used in another location.

Figure 6A:
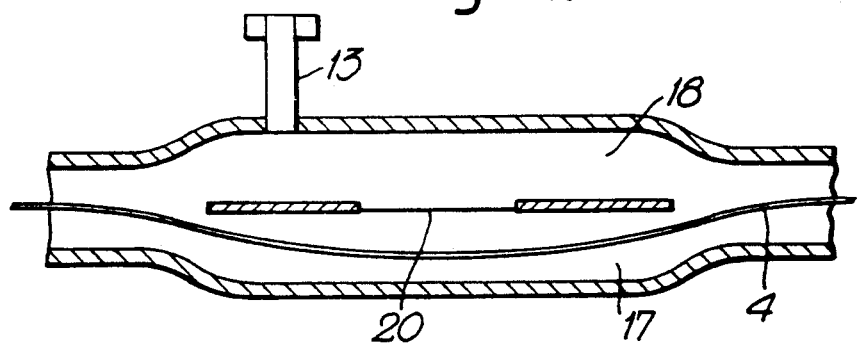
FIGS. 6a, 6b and 6c and FIGS. 7a, 7b and 7c are further embodiments of the inhibiting release mechanism respectively permitting and inhibiting fibre propulsion.
Figure 6B:
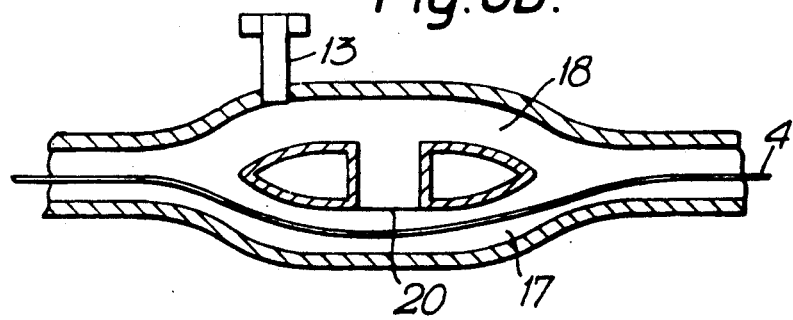
Figure 6C:
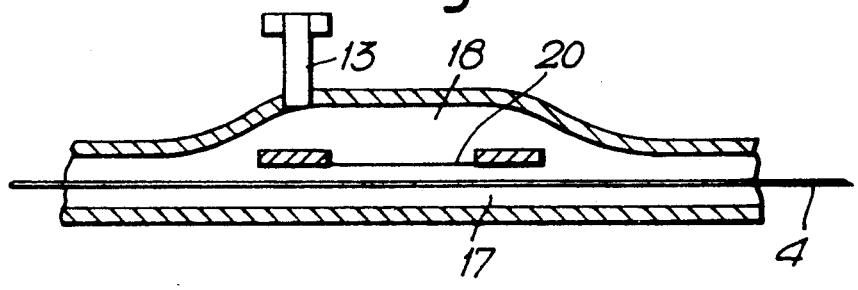
Figure 7A:
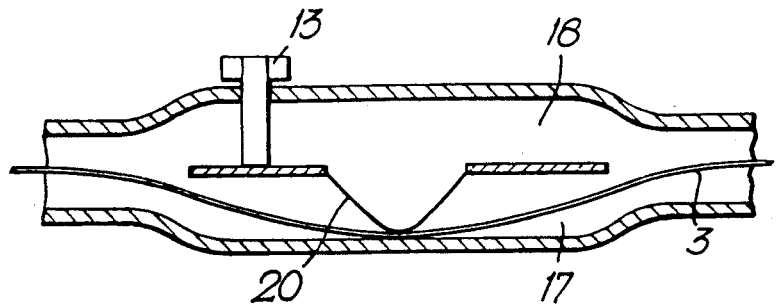
Figure 7B:
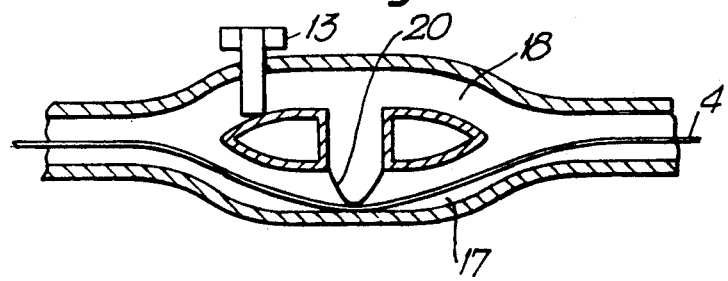
Figure 7C:
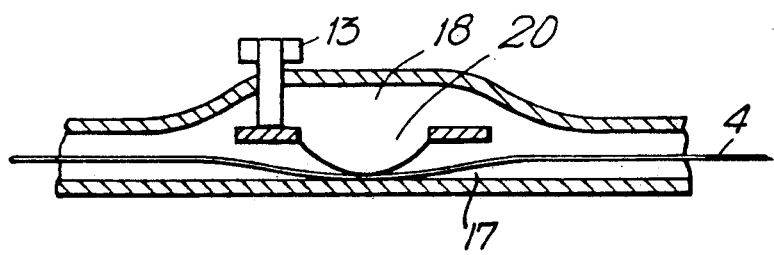
Figure 8:
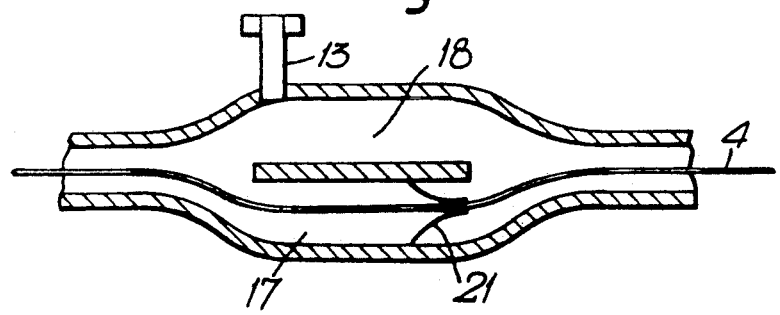
FIG. 8 is a further embodiment of fibre release inhibitor.

The structure of the passageways 17 and 18 as shown in FIGS. 4 and 5 may comprise two side-by-side tubes with a common wall portion, the common wall portion having three ports, the end ports being for diversion of the fibre and the central port for the provision of the flexible membrane 20. The fibre diversion tube (the passageway 17) may be made smaller than the passageway 18. An equivalent arrangement may be made with a partition down a single tube (as shown in FIG. 6a), by a branched structure (FIG. 6b), or by a diversion path for the propellant (FIG. 6c) leaving a straight-through path for the fibre 4. This latter arrangement with a straight fibre path is particularly preferable. In each case, the general principle is the same, two passageways with communicating entry and exit ports and an intermediate port blocked by a membrane. The fibre 4 passes along one route and the alternative route can be blocked by a valve. FIGS. 7a, b and c show the same embodiments with the fibre braked.

Another alternative to the embodiments shown in FIGS. 4 to 7 is to eliminate the port with the flexible membrane, and to locate a pressure-sensitive seal around the entry port to the fibre passageway 17. Under flow conditions, the seal 21 (shown in FIG. 8) lightly rests against the fibre 4, but, as soon as pressure builds up above a predetermined level in the propellant passageway 18, the seal is urged tightly around the fibre, preventing further movement or escape of propellant into passageway 18. With this latter embodiment, the restriction caused by the seal 21 means that the main flow of propellant is along the passageway 18, and the section of the fibre 4 within the fibre passageway 17 is not subjected to viscous drag. However, the length of the fibre 4 within the passageway 17 is not sufficient to significantly influence the installation.

In a further embodiment, instead of relying solely upon pressure within the container 5' to propel the fibre 4 along the duct 19, the container is fed with air (or other gas) through the port 22 from a suitable source (not shown) and at sufficient pressure to advance the fibre along the duct. The container 5' remains pressurised, at a substantially constant pressure, during the fibre withdrawal procedure, the flow for the propulsion being provided by the source. Once sufficient installation along the duct 19 has been achieved the source is removed and the pressure in the container 5' is permitted to fall to atmospheric pressure. With this arrangement, it is not necessary to have a fibre brake, because removal of the source inhibits further fibre advancement, and it is not necessary to seal the container 5' to retain propellant pressure.

In a further modification of the invention, shown in FIG. 2a, the container 5 is provided with an inflatable membrane or balloon 24. Air is introduced to inflate the balloon via a valve 23 so that it presses against coils of the fibre 4 wound in the container 5 as previously described. This arrangement is particularly useful for aiding storage, especially for example for long term storage, or when the fibre coils are many layers deep, when the wound coils may become liable to mispositioning due to the container being knocked or roughly handled. To release the fibre 4, it is possible either to deflate the balloon or membrane 24 or, more preferably, by the pressure in the balloon or membrane being such that the pressure to which the interior of the container 5 is raised in order to blow the fibre along the duct 19 is sufficient partially to collapse the balloon or membrane out of holding contact with the turns. It will be realised that at least some of the balloon or membrane 24 could remain gently touching the fibre 4, but insufficiently to cause significant retardation. It is also envisaged that, in situations where a fibre brake is not provided, such as when the propellant gas comes from an external source rather than an internal source, adjustment of pressure within the container 5 and/or within the balloon or membrane 24 will also provide a means to control fibre advancement by virtue of greater or lesser contact pressure between the turns of fibre and the balloon or membrane.

Figure 10A:
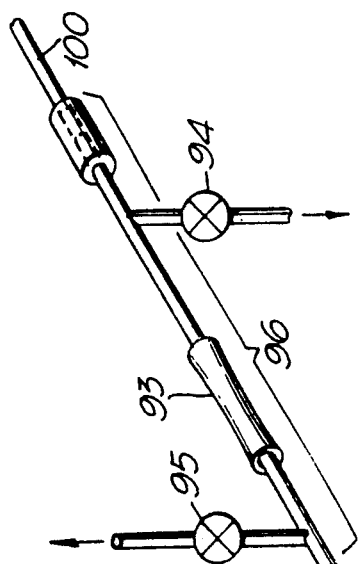
FIG. 10a is a schematic diagram of a fibre blowing system according to the invention.
Figure 10B:
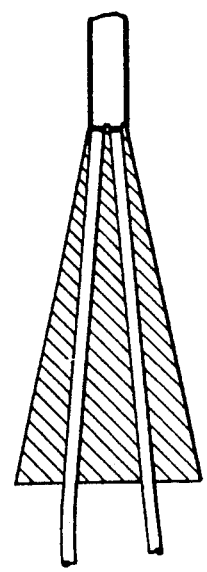

FIGS. 10a and 10b show a fibre blowing system which uses containerised fibre according to the present invention. The system facilitates easy and efficient installation of optical fibre, in particular primary coated fibre either one fibre at a time or several fibres at a time. The system uses only a minimal amount of air for the duct size and blowing rate used, because during fibre blowing all the compressed air which is supplied to the system is fed into a pre-installed duct 100.

The operation of the system is as follows. If the bottles 99 of fibre which are to be used are substantially unpressurised, that is they are nominally at atmospheric pressure, the fibre from each bottle is manually or otherwise fed through a respective feed tube 98, through a tapered manifold 97, through a blowing head 96 and into the mouth of the pre-installed duct 100. Normally, it should not be necessary to introduce the fibre(s) more than 1 or 2 meters into the pre-installed duct 100 before blowing commences. Where the fibre blowing system provides only low friction against the passage of the fibre(s), less than 1 meter of fibre may be sufficient to enable quick initiation of blowing. This operation is facilitated if one or more of the blowing head 96, the tapered manifold 97 and the feed tubes 98 is or are split in a suitable manner. After feeding the fibre through the blowing apparatus and sealing any split portions thereof, an exhaust valve 95 is closed (if previously open) and an inlet valve 94 is opened. Low pressure compressed air, typically at 60 psi or less, for example 3–4 Bar, is fed in, pressurising the bottles 99 and the blowing apparatus. Continued supply of compressed air causes air to vent through the duct 100.

Depending on how much fibre has already been fed into the duct 100, care should be taken during the initial pressurisation of the system to avoid blowing the fibre back towards the bottles 99. Use of a low pressure, for example 1 Bar or 1 to 2 Bar, which is gradually increased, is beneficial. Once the system starts to be pressurised, air starts to escape via the pre-installed duct 100. The effect of this air flow is to cause the fibre or fibres to start advancing further into the pre-installed duct 100 under the influence of distributed viscous drag forces. As the length of fibre in the pre-installed duct 100 grows, so the strength of the viscous drag force increases. At the initiation of the fibre blowing process, it may be necessary to pulse the air supply fairly rapidly between 0.3 and 1 second between pulses, possibly by providing short pulses (less than 1 second duration) of higher pressure air, in order to initiate fibre advancement. Blowing pressures up to 150 psi may be used, depending upon the burst strength of the bottles 99 and the integrity of the system. Typically, however, pressures in the range 40 to 100 psi will be used, for example in the range 40 to 60 psi. When it is desired to stop or to interrupt blowing, the air inlet valve 94 is closed. Bottles of the type used for carbonated soft drinks, such as those made of PET, typically have burst pressures of 10 Bar, so can safely be operated at 3 to 4 Bar.

If pressurised bottles 99 of fibre are available, the pressurised gas inside the bottles may be used in the initial fibre feeding stage. The valves 95 and 94 are closed, and a clamp 93 is opened. The bottles 99 are sealed to their respective feed tubes 98 after the introduction of the fibre ends into the tubes. The valves on the bottles 99 are then opened to blow the fibres through the feed tubes 98, the tapered manifold 97 and the blowing head 96 and into the duct 100. Blowing then proceeds as before, with compressed air fed via the inlet valve 94. When it is desired to stop or interrupt fibre blowing, the clamp 93 which comprises a portion of soft resilient tubing, typically of silicone rubber, through which the fibres pass, and an external clamp arrangement, is closed non-abruptly. If fibre blowing is to be terminated, the valves on the bottles are then closed and the exhaust valve 95 is opened.

When transparent bottles having fibre support means such as those shown in FIG. 9 are used, it is advantageous, when loading the bottles, to coil the fibre so that each level of supports carries a predetermined length of fibre, for example 100, 200 or 250 meters. The fibre will also normally be wound so that the top coil is fed out first, the next lower coil next, and so on down to the bottom of the bottle. With such an arrangement, it then becomes easy for the operator of the blowing equipment to monitor how much fibre has been fed out.

Where a pre-installed duct 100 is intended only ever to carry one or two fibres or fibre bundles, the internal bore of the duct can be as small as 2 mm across. More usually, a bore 3.5 mm across, normally 3.5 mm diameter, is suitable as it offers the possibility of many fibres or fibre bundles being installed, either simultaneously or sequentially. Fibres or fibre bundles may of course be installed many months or years after the duct is installed in a building.

The present invention in all its aspects is particularly suitable for use in the installation of optical fibres in buildings or in 'campus' type applications. The low cost of the preferred containers for the fibres, and the simplicity, efficiency and quickness of the blowing system all contribute to making the system very attractive for in-building use.

While the present invention has been particularly described with reference to 'bare optical fibre', such as that shown in FIG. 1, it is similarly applicable to other fibre packages provided that they are reasonably set resistant. Thicker fibre members, such as those provided with additional resin coatings, and those comprising more than one fibre, will in general require the use of larger diameter containers.

Because there is, during fibre blowing, no flow of air through the tapered manifold 97, changes of section, which might otherwise give rise to venturi effects or pressure gradients, are not generally significant. It is of course important to minimise the friction between the running fibre and the blowing apparatus, including the manifold 97, but the fact that a venturi effect is not required for successful blowing generally eases the design constraints, so that friction effects can be tackled practically independent of other considerations. For the avoidance of doubt, it is emphasised that the blowing system described with reference to FIG. 10 does not need or rely on any venturi or other pressure drop effects in the blowing apparatus, but that the presence of any such effects, should they arise, will not in general detract from the utility of the system. The fact that no 'venting'—that is the passage of propellant gas to waste other than through the pre-installed duct—is needed during the fibre blowing process, means that the process can use very low pressures, for example 1–2 Bar or 3–4 Bar, be very quiet and efficient.

I claim:

1. An optical fibre storage system comprising a container having turns of optical fibre wound within it in a substantially helical formation, the diameters of the turns and the container being such that the turns of the fibre are maintained in position by their natural resilience pressing them outwardly against the inside of the container.

2. An optical fibre storage system according to claim 1, in which the inside wall of the container is provided with a fibrous coating.

3. A storage system as claimed in claim 1, wherein means are provided within the container, and adjacent to the wall or walls thereof, to provide additional support at a plurality of points throughout the height of the container.

4. A storage system as claimed in claim 3, wherein said means comprise a plurality of resilient elongate members.

5. A storage system according to claim 1, in which an inflatable member is located inside the turns such that upon inflation it presses outwardly to support the turns.

6. A storage system according to claim 1, in which the container has an inlet for a source of compressed gas.

7. A storage system according to claim 1, in which the container is pressurised.

8. Apparatus for storing optical fibres, the apparatus comprising a container, and a fibre-dispensing tube within the container, the tube having first and second contiguous portions, the first tube portion extending axially within the container, and the second tube portion extending generally radially towards a side wall of the container, the tube and the container being relatively axially rotatable and being arranged to have relative axial movement so that fibre emerging from the free end of the second tube portion is laid around the inner wall of the container in a helical coil.

9. Apparatus according to claim 8, in which the fibre is propelled through the tube by a flow of gas.

10. Apparatus according to claim 8, in which the tube is rotated within the container so that each turn of fibre has 360 degrees of torsion.

11. A method of installing an optical fibre member into a previously-installed duct, the method comprising the steps of connecting a container of fibre to the previously-installed duct, via a blowing apparatus, and providing a gas-tight seal therebetween, introducing a supply of propellant gas directly into the blowing apparatus at a point intermediate the container and the duct, and initiating advance of the fibre member solely as the result of viscous drag forces caused by the flow of the propellant gas past the fibre member, the rate of advance of the fibre member in the duct being substantially less than the flow velocity of the propellant gas in the duct.

12. A method of installing an optical fibre member into a previously-installed duct, the method comprising the steps of:
connecting a closed container of optical fibre member to a fibre blowing apparatus:
connecting the fibre blowing apparatus to the previously-installed duct;
providing a supply of gas at a pressure greater than atmospheric, the gas being fed into the blowing apparatus at a point between the container and the duct;
introducing a length of optical fibre without significant slack into the duct;
initiating advance of the optical fibre member within the duct by viscous drag effects caused by the flow of propellant gas over the fibre member within the duct;
continuing the advancement of the optical fibre member within the duct by means of viscous drag acting on the increasing length of the optical fibre member within the duct.

13. Apparatus for the installation of optical fibre members into a previously-installed duct, the apparatus comprising blowing means and one or more closed containers of optical fibre member, the blowing means having an inlet end and an outlet end, and the blowing means comprising means for the sealable connection of the inlet end to one or more of the closed containers, means for the sealable connection of the outlet end to the duct, a bore for the passage of fibre member, the bore connecting the inlet end to the outlet end, and a gas inlet to the bore, the gas inlet being positioned at a point intermediate the inlet end and the outlet end, wherein the bore of the blowing means intermediate the outlet end and the gas inlet is substantially free from venturi forming structures, whereby the blowing means serves, in use, to advance the optical fibre member solely by viscous drag effects.

14. Apparatus for storing optical fibers, the apparatus comprising a container, and a fibre-dispensing tube within the container and extending from the container, a passageway being defined by the fibre-dispensing tube, a dividing wall being provided in the passageway to divide the passageway into a double passageway, with optical fibre in the tube being diverted into one of the passageways of the double passageway and the other of the passageways being provided with a valve means, and a flexible, elastic member being provided to close the passageway wherein the optical fibre is diverted upon application of a propellant to the container and closure of the valve means.

15. Apparatus according to claim 14, wherein the flexible, elastic member is at least partially formed by the dividing wall.

* * * * *